Jan. 6, 1970　　　　　G. M. CRAIG　　　　　3,488,224
FUEL CELL ELECTRODE ASSEMBLY AND METHOD OF REGENERATING CELL
Filed Nov. 7, 1966
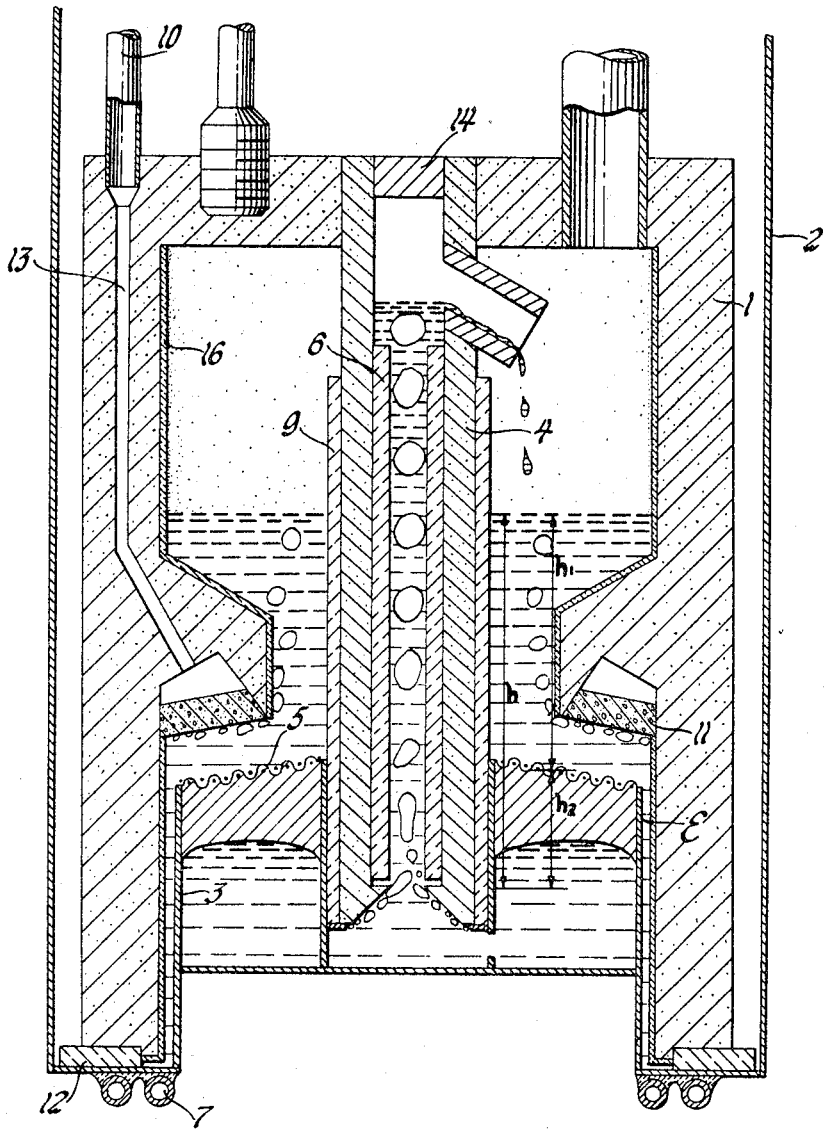
INVENTOR.
Gale M. Craig
BY
Robert J. Wallace
ATTORNEY

United States Patent Office

3,488,224
Patented Jan. 6, 1970

3,488,224
FUEL CELL ELECTRODE ASSEMBLY AND METHOD OF REGENERATING CELL
Gale M. Craig, Anderson, Ind., assignor to General Motors Corporation, Detroit, Mich., a corporation of Delaware
Filed Nov. 7, 1966, Ser. No. 592,558
Int. Cl. H01m 27/14
U.S. Cl. 136—86                          19 Claims

ABSTRACT OF THE DISCLOSURE

Regenerative fuel cells utilizing liquid reactant and more specifically to cells wherein the regeneration of the reactants is accomplished within the cell itself.

---

The expression "regenerative fuel cells" as used herein is intended to encompass those fuel cells in which at least one of the reactants is recovered from the electrolyte and reused by the cell. Regenerative type fuel cells wherein one or both of the reactants are externally recovered from the electrolyte and cycled back to the cell for reconsumption therein are known. Thermal, electrolytic and chemical methods of external regeneration have been employed. Such methods require auxiliary equipment and in addition are unduly costly. This auxiliary equipment adds to the overall weight of the system thereby reducing the effective power to weight ratio. This power to weight ratio is oftentimes a critical design factor in such areas as missiles, extraterrestrial excursion equipment, mobile power packs, etc. Appreciable development has therefore been directed toward obtaining fuel cells having higher power to weight ratios. Cells which are completely reversible and which store both the cell reaction products and recovered reactants in situ eliminate the need for the aforesaid auxiliary equipment thereby increasing the power to weight ratio. I have already provided a significant advancement in power to weight ratios of regenerative fuel cells by my previous invention disclosed and claimed in U.S. patent application Ser. No. 557,954, entitled Fuel Cell Electrode, filed June 16, 1966.

Briefly, Ser. No. 557,954 involves an internally regenerative fuel cell system and an electrode for use therein wherein the ratio of the specific gravity of the electrolyte to that of the electrodes associated reactant was greater than unity. By the expression, "associated reactant" is meant that fuel or oxidizer, as appropriate, which is used solely with a particular electrode. An electrode in the system of Ser. No. 557,954 has a liquid reservoir, an active element between the reservoir and the cell electrolyte and a pumping means for removing liquid from the reservoir when appropriate. The term "active element" means a penetrable portion of the reversible electrode which is situated between and communicates the inside with the outside of the reservoir and which serves as the electrochemical conversion situs by virtue of its being the electron acceptor or donor during discharge or recharge, as appropriate. During discharge, the electrode continuously maintains a reactant-electrolyte electro-chemical reaction interface at the electrode's active element. During recharge, the active element of the electrode electrolytically dissociates the electrolyte and selectively extracts the electrode's associated reactant. The electrode stores in situ the thus extracted dissociation product which subsequently becomes available for reconsumption within the cell under discharge conditions.

The preferred pumping means for the electrode of my previous invention is an air lift type pump. The air lift type pump of my previous invention requires an inert gas to effect the pumping action. By the instant invention, I have improved the electrode of my previous invention by eliminating the need for an inert gas to effect the pumping. The elimination of this requirement is highly desirable. This elimination obviates the need for any inert gas storage and/or flow control auxiliary equipment, resulting in even higher power to weight ratios. Additional elimination of the inert gas precludes the difficulties associated with efficiently condensing a mixture or reactant and inert gases for subsequent storage and reuse of the reactant gas.

An object of my invention is to provide an improved electrode over that of my previous invention which is embodied in Ser. No. 557,954, filed June 16, 1966, which improved electrode is completely reversible and designed for use in a fuel cell, which fuel cell's liquid reactant and electrolyte are such that the ratio of the specific gravity of the electrolyte to that of the reactant is other than unity.

It is a further object of my invention to provide a cell having the improved electrode of my invention whereby the requirement for inert gas storage and flow control apparatus previously necessary for the operation of the cell disclosed and claimed in Ser. No. 557,954 is obviated by the use of the cell's gaseous reactant to effect the pumping action.

It is a still further object of my invention to provide an improved process for the recharge of fuel cells wherein the cell's liquid reactant and electrolyte are such that the ratio of the specific gravity of the electrolyte to that of the reactant is other than unity.

FIGURE 1 is a sectional, elevational view of a typical cell having the electrode of my invention.

Briefly stated my invention involves an improved regenerative fuel cell system wherein the cell has an electrolyte-liquid reactant specific gravity ratio of other than unity (i.e., 2.16). An integral part of this system is a reversible electrode having a liquid reservoir, an active element between the reservoir and the electrolyte, and an air lift type pumping means which generates its own pumping gas for removing liquid from the reservoir on recharge. The pump of my improved electrode generates its pumping gas by electrolytically dissociating that portion of the cell's electrolyte which is in the electrode's reservoir. Hence, the electrode of the instant invention employs an electrolytic lift pump, as it were, in the stead of that previously used in Ser. No. 557,954. Hence, the electrode of the instant invention differs from that of my previous invention by eliminating the requirement for a source and plumbing system for an inert pumping gas by internally generating its own pumping gas requirements. The electrolyte in the reservoir is electrochemically dissociated at the base of the pump's lift tube. The gaseous component of the electrolyte percolates up through the lift tube to effect the pumping action. The liquid component formed in the reservoir plates, as it were, onto the walls of the reservoir along which it creeps to form a pool of regenerated liquid reactant in the reservoir. Like the electrode in my previous invention, this electrode, during discharge, continuously maintains a reactant-electrolyte, electrochemical reaction interface at the electrode's active element. Similarly, during recharge, the active element of the electrode electrolytically dissociates the electrolyte and selectively extracts the electrode's associated reactant. The reservoir of the electrode stores in situ the thus extracted reactant which subsequently becomes available for reconsumption within the cell under discharge conditions.

As previously indicated, the electrode of my invention comprises a reservoir, an active element and an improved pumping means. One wall of the reservoir contains the penetrable element which serves as the electrochemical conversion surface of the electrode. The aforementioned penetrable element permits the flow of liquid reactant in either direction therethrough, depending upon the direction of the differential pressure existing across same. In its fully charged condition, the aforementioned reservoir is substantially filled with reactant. In its fully discharged condition the reservoir is filled with an electrochemically dissociable reactant displacing liquid. The cell's electrolyte is the preferred displacing liquid. The improved pump, which, in combination with the reservoir and active penetrable element, is the essence of my invention, is provided to remove the displacing liquid from the reservoir as required. When the electrode is completely immersed in a liquid electrolyte, the reservoir filled, and the pump at rest, substantially no differential pressure exists across the penetrable element. With the activation of the pump on recharge and the attendant depletion of the liquid within the reservoir, a pressure differential in the direction of the reservoir is established across the penetrable element.

When fully discharged the reservoir is filled with electrolyte. To charge, current is applied to the cell resulting in the electrolytic dissociation of the electrolyte into its constituents, one of which is the liquid reactant associated with the electrode. When the pump is actuated, which in the instant invention occurs automatically with the application of current to the cell, a pressure differential across the active element of the electrode is effected and liquid reactant flows through the element into the reservoir. By balancing the rate of electrolytic dissociation of the electrolyte with the rate of liquid depletion from the reservoir, the reactant formed by the electrolyte dissociation reaction is drawn into the reservoir at the same rate at which it is produced. The thus generated reactant fills the reservoir space previously occupied by the electrolyte, which was pumped out. To prevent the passage of electrolyte through the penetrable element under conditions where the dissociation rate is not perfectly balanced, a penetrable element is used which is wet more by the reactant sought to be recovered than by the electrolyte. Hence a ratio of the wetting characteristics of electrolyte to reactant of less than unity is preferred. In this situation the reactant to be recovered readily passes through the penetrable element as long as the differential pressure established is sufficient to overcome the buoyant forces acting on the reactant. The electrolyte, which does not wet the penetrable element, will not pass through until a certain additional minimum pressure differential is exceeded, i.e., sufficient to overcome the effects of surface tension between the electrolyte and the penetrable element. Passage of the electrolyte through the penetrable element is not particularly detrimental to the electrode's operation. When it does happen, the electrolyte passes dropwise through the floating reactant and merges with the electrolyte pool at the bottom of the reservoir. As will be noted later, under discharge conditions there may be a need for the passage of electrolyte through the element.

When fully charged, the reservoir is substantially full of reactant. In the preferred embodiment the reactant floats atop the electrolyte, which remains at the bottom of the reservoir. In the preferred embodiment the uppermost surface of the reactant contacts the penetrable element, which is the active element of the electrode. However, the location of the penetrable element need not necessarily be restricted to the upper wall of the reservoir, as will be discussed hereinafter. An electrochemical reaction interface between the reactant and the electrolyte is thus established at the element. As the reactant material is buoyant, it tends to rise to the surface of the electrolyte outside the reservoir. To preclude this, the surface tension at the interface must be sufficient to withstand the buoyancy forces. If the surface tension at the interface were insufficient, the reactant would flow through the element upwardly through the electrolyte and physically contact the counterelectrode to the detriment of the cell.

When discharging, the reactant is consumed, thereby reducing the volume of liquid in the reservoir proportionately. In order to maintain the reactant in contact with the active surface of the electrode, it is necessary to add electrolyte to the reservoir at substantially the same rate as the reactant is consumed. A means for readmitting the electrolyte to the reservoir is therefore required. Any of a variety of means for effecting this replacement is possible as long as during discharge it can keep the reservoir full. During discharge the ratio of reactant to electrolyte in the reservoir decreases until there is no reactant remaining.

A specific example of an electrode encompassed within the scope of my invention and a cell employing same is shown in FIGURE 1. The FIGURE 1 cell was designed specifically for use in a $Li/LiCl/Cl_2$ system. However, it is obvious that such an electrode may be used in any other system where the properties of the respective materials are similar to the $Li/LiCl/Cl_2$ system.

In FIGURE 1 a cell container 1 houses the essential components of a $Li/LiCl/Cl_2$ fuel cell. The cell container 1 may advantageously be constructed from stainless steel, dense graphite, and/or any material which is not attacked by the chemical components of the system. As shown it is constructed of dense carbon. In addition to nonreactivity with the chemical components of the system, other factors such as strength, weight, electrical and thermal conductivity, etc., should be considered when selecting which material is to be used in any given system. The cell container 1 is encased in a stainless steel casing 2 which helps retain the corrosive materials in the cell were the container 1 to crack or leak. Cooling coils 7 locally freeze the electrolyte at the junction of the carbon of cell container 1, the ceramic 12 and the stainless steel 2 thereby providing an effective corrosion resistant seal at that point in addition to increasing the wettablity of the cell's walls. A ceramic coating 16 electrically insulates the carbon of cell container 1 from the electrolyte pool. An annular $Cl_2$ electrode 11 is positioned opposite the active element 5 of the fuel electrode E. In this particular embodiment the electrode E is an internal part of the casing 2 and hence electrical contact can be made directly to the casing 2. The electrode 11 is canted somewhat to readily permit the escape of gas from its surface. Correspondingly the active element 5 is canted to insure a uniform electrolyte thickness between the electrodes. $Cl_2$ feed tube 10 supplies the electrode 11 via passage 3. The oxidizer electrode 11 is a conventional gas type comprised of materials which are compatible with the environment. I prefer to use porous carbon in the $Li/LiCl/Cl_2$ system. However, in a lower temperature system any porous metal, such as nickel, might also be used.

The fuel electrode E has a stainless steel reservoir 3 which holds lithium when fully charged and LiCl when fully discharged. The dense carbon tube 4 provides an electrically conductive path to within the electrode's reservoir 3, a means for replenishing or removing the reactant, and a lift tube for the removal of the electrolyte to be discussed hereafter. Any electrically conductive conduit compatible with the materials of the system may however be employed. Plug 14 seals tube 4. The tubular shape is preferred. A separate electrically conductive means other than the conduit itself may be provided in conjunction with a nonconducitve conduit, however, I prefer to use a conductive conduit. Tube 4 is provided with a ceramic sheath 9 to electrically insulate the outside of the tube from the bulk of the cell's electrolyte. By so doing, $Cl_2$ will not be generated at the outer surface during recharging. Tube 4 also has a ceramic tubular insert 6 closely fitted to its inner diameter. The insert 6 is readily wet by LiCl whereas the dense carbon is not. As a result of insert 6, resistance to flow of LiCl up the tube 4 is minimized. The insert 6 performs the additional function of insulating the inner surface of tube 4, hence, localizing the region where the dissociation can occur. On the upper surface of the reservoir 3 is an electrically conductive penetrable element 5 which serves as the active surface of the electrode. The penetrable element 5 may comprise a metal screen, woven wire, sintered metal, or any other material which is inert to the chemical components of the system, is electrically conductive, and will permit passage of liquid in either direction. A material which is wet more by the reactant to be recovered than by the electrolyte is prefered. For a Li/LiCl/Cl$_2$ system, I prefer to use a sandwich of two layers of type 316 perforated stainless steel separated by a layer of 50 x 50 mesh type 316 stainless steel screen having a wire diameter of 0.007 inch. This arrangement gives a thickness of about 0.032 inch with an effective hole size of 0.016 inch. Generally speaking, for best results, the hole diameter should not exceed the element thickness. The stainless steel is wet by molten lithium but not by molten lithium chloride. The lithium, therefore, readily passes through the screen under differential pressures which are insufficient to force the LiCl through. The pumping means of my present invention is provided to remove liquid from the reservoir, as appropriate, to effect the pressure differential. When using a pump of the type of my invention the maximum allowable pressure differential across the element 5 is established equal to the total head $h$ when the liquid level in tube 4 corresponds to the bottom of tube 4. The level of LiCl in the tube 4 may, of course, be higher and if so, the differential pressure across element 5 will be correspondingly lower. The head $h$ is comprised of two liquid heads, $h_1$ and $h_2$. The head $h_1$ is equal to the height of the electrolyte head above the element 5. The head $h_2$ is equal to the height of the liquid head between the element 5 and the input end of lift tube 4. It should be noted that the $h_2$ will vary during the course of charging because the respective heads of lithium and lithium chloride between the element 5 and the input of lift tube 4 varies from a maximum equal to the density of lithium chloride (1.484 g./cm.$^3$) times $h_2$ to a minimum of the density of molten lithium (0.469 g./cm.$^3$) times $h_2$.

When the cell is fully charged, the reservoir is substantially filled with floating reactant, i.e., molten lithium. Electrolyte fills the balance of the reservoir. The lithium which is floating atop the LiCl in the reservoir 3 is prevented from escaping through the element 5 because of the interfacial tension existing at the element, electrolyte, and reactant interface. The interfacial tension must be such as to prevent the heavier LiCl from passing through the element and displacing the lighter Li.

To discharge the cell Cl$_2$ is admitted through feed tube 10 and an external electrical circuit closed. The Li in contact with the element 5 is electrochemically consumed in the formation of lithium chloride. In order to insure contact of the fuel with the element 5 at all times, it is necessary to admit LiCl to the reservoir 3 in order to compensate for that volume of floating Li which is consumed. Any convenient way for doing this is acceptable so long as the electrolyte input means admits only that volume of electrolyte which is equal to the volume of the fuel consumed. A convenient way of effecting this result is to provide an electrolyte input means which has a pressure drop across it which is less than the pressure differential required to pass electrolyte through the bulk of element 5. A convenient way of providing this means is to have at least one discontinuity, i.e., relatively large pore or path, through element 5 which is less resistant to the flow of electrolyte than is the rest of element 5. When using a perforated sheet such as discussed heretofore a larger hole in the order of 0.063 inch is satisfactory. The differential pressure required to effect flow of electrolyte through the larger pores is necessarily less than that required to effect the flow of electrolyte through the rest of element 5. As the reactant is electrochemically consumed at element 5 at a reduction of the volume of the fluid in reservoir 3 results. A differential pressure across element 5 is created. When the differential pressure across element 5 increases beyond the point where electrolyte flow through the larger pores occurs, electrolyte enters the reservoir 3 dropwise, sinking through the lighter reactant and merging with the electrolyte pool at the bottom of the reservoir. Another convenient means for introducing electrolyte into the reservoir is a capillary tube extending from the electrolyte within the reservoir to a point immediately external to the reservoir. The size and properties of the capillary tube may be determined using the same considerations required to determine the aforementioned larger pores of element 5. Whatever electrolyte admission means is employed, it must respond to a pressure differential across it which is less than $h$ else gas would undesirably back up into the reservoir. Hence, as discharge continues, reactant is consumed at the element 5, replacement electrolyte is admitted to the reservoir 3, and the reactant to electrolyte interface within the reservoir rises until all the reactant is consumed.

To recharge the cell a source of direct current is applied to the cell so as to effect the electrolytic dissociation of the electrolyte. As soon as the current is applied lithium and chlorine are generated. Some chlorine is formed at electrode 11 and some Li is formed at the active element 5. Additional Cl$_2$ is formed at the bottom of tube 4 which is maintained at the potential of Cl$_2$. This additional Cl$_2$ bubbles up through the ceramic tubular insert 6 carrying with it some of the electrolyte in the reservoir. Additional Li is plated onto the inside of the reservoir and eventually merges with the Li pool being formed beneath the actual element 5. The pumping action of the bubbling gas effects a pressure differential across the element 5. Due to the differential pressure existing across the element 5 and the respective wetting characteristics, the Li formed at the element 5 is preferentially drawn through the element 5 to the exclusion of the LiCl. This process continues until the Li-LiCl interface in the reservoir recedes to slightly above the lower end of the lift tube 4. The charging current is discontinued and the cell is in condition for discharge.

The exact location and structure of the active element 5 may be varied to meet the requirements of a given system. Hence, in a system where the ratio of the specific gravity of the reactant to be regenerated is less than unity, the element 5 may advantageously be placed at the bottom of the reservoir, and the electrolyte admission and removal means rearranged to respond to the charged environment. Obviously the counterelectrode would also have to be moved so as to be properly oriented opposite the element 5. Similarly, for either system, i.e., where $$\frac{\text{specific gravity of electrolyte}}{\text{specific gravity of reactant}} \text{ is} > |\text{or}< |$$

the element 5 may be located on the side of the reservoir. In this connection, however, the wettability of the element by the reactant must be such as to keep it coated with reactant regardless of the location of the reactant-electrolyte interface within the reservoir. Relatively flat cylyindrical reservoirs in combination with small pores in the element 5 seem to be effective to keep side wall elements wet with reactant.

Therefore, though my invention has been described in terms of a certain preferred embodiment, it is to be understood that others may be adapted and that the scope of my invention is not limited except by the appended claims.

I claim:
1. A fuel cell electrode assembly having means for the recovery and in-place storage of an associated liquid reactant, said electrode assembly comprising a reservoir for receiving and dispensing both said liquid reactant and an electrolyte which is dissociable into at least one gaseous reactant, an electrically conductive penetrable element in a wall of said reservoir communicating the inside of said reservoir with the outside of said reservoir, a means for continuously maintaining said reactant in said reservoir in contact with said conducting penetrable element, and means for maintaining a pressure differential across said element in the direction of said reservoir when recharging said electrode assembly, wherein said pressure differential maintaining means comprises an electrically conducting conduit adapted to extend from below the electrolyte level within said reservoir to a point above the electrolyte level in said cell, said conduit being electrically insulated from said reservoir and adapted to be maintained at the potential of said gaseous reactant during recharge.

2. The fuel cell assembly as claimed in claim 1 wherein said electrically conductive penetrable element is more wettable by said reactant than by the electrolyte of said cell.

3. The fuel cell assembly as claimed in claim 2 wherein said means for continuously maintaining said cell reactant in said reservoir in contact with said conductive penetrable element is at least one discontinuity in said penetrable element wherein the ratio of the pressure drop across said discontinuity required to break the interface at said discontinuity to the pressure drop required to break the interface across the rest of said element is less than unity.

4. The fuel cell assembly as claimed in claim 1 wherein said electrically conducting conduit has a hollow insert within its confines and contiguous its inner surface, which insert is comprised of a material which is electrically nonconducting and more wettable by said electrolyte than is the material comprising said conduit.

5. The fuel cell assembly as claimed in claim 1 wherein said electrically conducting conduit has a sheath closely fitted about its outside dimensions, which sheath electrically insulates the conduit from is immediate surroundings.

6. In a regenerative fuel cell for use in an electrochemical system in which there is at least one liquid reactant, the ratio of the specific gravity of the systems electrolyte to the specific gravity of the systems liquid reactant is greater than unity and the electrolyte is electrolytically dissociable into at least one gaseous product, said cell having a reservoir for receiving and dispensing liquid reactant and electrolyte, an electrically conducting penetrable element in a wall of said reservoir communicating the inside of said reservoir with the outside of said reservoir, means for admitting electrolyte to said reservoir to buoy the reactant up while discharging the cell, and means for maintaining a pressure differential across said element in the direction of said reservoir while recharging the said cell, the improvement comprising said pressure differential maintaining means being an electrically conducting conduit extending from below the electrolyte level within said reservoir to a point above the electrolyte level in said cell, which conduit is electrically insulated from the reservoir and is maintained at the potential of the gaseous product during recharge of said cell.

7. The device as claimed in claim 6 wherein said element is wet more by said reactant to be generated than by said electrolyte.

8. The device as defined in claim 7 wherein said means for admitting electrolyte to said reservoir comprises at least one discontinuity in said penetrable element wherein the ratio of the pressure drop across said discontinuity required to break the interface at said discontinuity to the pressure drop required to break the interface across the rest of said element is less than unity.

9. In a molten-metal, fused salt electrolyte fuel cell in which the ratio of the specific gravity of the electrolyte to the specific gravity of the molten metal is greater than unity and the electrolyte is electrolytically dissociable into at least one gaseous product, said cell having a reservoir for holding electrolyte and molten metal, an electrically conductive penetrable element situate between and communicating the inside with the outside of said reservoir, means for admitting electrolyte to said reservoir to buoy said molten metal up while discharging the cell, and means for establishing and maintaining a pressure differential across said element in the direction of said reservoir while recharging said cell, the improvement comprising said pressure differential maintaining means being an electrically conducting conduit extending from below the electrolyte level within said reservoir to a point above the electrolyte level in said cell, which conduit is electrically insulated from the reservoir and is maintained at the potential of the gaseous product.

10. The device as claimed in claim 9 wherein said electrically conducting conduit has a hollow insert within its confines and contiguous its inner surface which insert is comprised of a material which is electrically nonconducting and more wettable by said electrolyte than is the material comprising said conduit.

11. The device as claimed in claim 9 wherein said electrically conducting conduit has a sheath closely fitted about its dimensions which sheath electrically insulates the conduit from its immediate surroundings.

12. The device as claimed in claim 9 wherein said molten metal is an alkali metal and said fused salt is an alkali metal halide.

13. The device as claimed in claim 12 wherein said molten metal is lithium and said halide is lithium chloride.

14. The device as claimed in claim 10 wherein said molten metal is an alkali metal, said fused salt is an alkali metal halide, and said insert is dense ceramic.

15. The device as claimed in claim 11 wherein said molten metal is an alkali metal, said fused salt is an alkali metal halide, and said sheath is comprised of dence ceramic.

16. A process for charging a regenerative type fuel cell wherein the cell's reactants are electrolytically regenerated from the cell's' electrolyte and wherein at least one of said reactants is a liquid and the other of said reactants is a gas, comprising the steps of providing a reservoir beneath the surface of said fuel cell's electrolyte which reservoir is substantially full of electrolyte, providing an electrically conductive penetrable element in at least one wall of said reservoir to communicate the inside of said reservoir with the outside of said reservoir, providing an electrically conducting conduit extending from below the electrolyte level within said reservoir to a point above the electrolyte level in said cell, said conduit being electrically insulated from said reservoir, and impressing an electromotive force on said electrically conductive penetrable element, counterelectrode and said conduit such that the potential of said electrically conducting conduit is at least equal to the electrode potential of the gaseous reactant, whereby reactant gas is generated at the end of the conduit which is in said reservoir which gas percolates up through the conduit carrying with it some electrolyte and establishes a pressure differential across said element in the direction of said reservoir.

17. A fuel cell comprising a cell enclosure, an electrode for a liquid reactant, and an electrode for a gaseous reactant, an electrolyte between said electrodes, which electrolyte is electrolytically dissociable into said liquid and gaseous reactants, said liquid reactant electrode comprising a reservoir for receiving and dispensing said liquid reactant and electrolyte, an electrically conductive penetrable element in a wall of said reservoir communicating the inside of said reservoir with the outside of said reservoir, means for continuously maintaining said liquid reactant in said reservoir in contact with said conductive penetrable element and means for establishing and maintaining a pressure differential across said element in the direction of said reservoir while recharging said cell, said pressure differential maintaining means being an electrically conducting conduit extending from below the electrolyte level in the reservoir to a point above the electrolyte level in the cell, said conduit being maintained at the electrode potential of said reactant and being electrically insulated from said reservoir.

18. The device as claimed in claim 17 wherein said conduit has a sheath closely fitted about its outside dimensions which sheath electrically insulates the conduit from its immediate surroundings.

19. The device as claimed in claim 17 wherein said conduit has a hollow insert closely fitted to the inside wall of said conduit which insert is an electrical nonconductor and is comprised of a material which is wet more by said electrolyte than is the material from which the conduit is made.

References Cited

UNITED STATES PATENTS

| 3,085,053 | 4/1963 | Taylor | 136—86 X |
| 3,110,631 | 11/1963 | Carlton | 136—86 |
| 3,285,781 | 11/1966 | Zito. | |

FOREIGN PATENTS

| 1,000,153 | 8/1965 | Great Britain. |

A. B. CURTIS, Primary Examiner

PO-1050
(5/69)

UNITED STATES PATENT OFFICE
CERTIFICATE OF CORRECTION

Patent No. 3,488,224　　　　　　　　　　Dated　January 6, 1970

Inventor(s)　Gale M. Craig

It is certified that error appears in the above-identified patent and that said Letters Patent are hereby corrected as shown below:

Column 4, line 48, the numeral "3" should be the numeral -- 13 --.

Column 6, line 45, insert -- electrolyte to the specific gravity of the -- after "the"; same column, line 48, "charged" should be -- changed --.

SIGNED AND
SEALED
JUL 21 1970

(SEAL)
Attest:

Edward M. Fletcher, Jr.
Attesting Officer

WILLIAM E. SCHUYLER, JR.
Commissioner of Patents